United States Patent [19]

Horton

[11] 4,024,724
[45] May 24, 1977

[54] MEANS AND METHOD FOR MAKING A FLOWLINE CONNECTION TO A SUBSEA CONNECTOR MEANS

[75] Inventor: Edward E. Horton, Portuguese Bend, Calif.

[73] Assignee: Deep Oil Technology, Inc., Long Beach, Calif.

[22] Filed: May 25, 1972

[21] Appl. No.: 256,740

[52] U.S. Cl. .................................. 61/110; 166/.6; 28/18
[51] Int. Cl.² .................................... F16L 35/00
[58] Field of Search ................. 166/.6, .5; 61/72.3, 61/72.1; 285/18, 24

[56] References Cited

UNITED STATES PATENTS

| | | | |
|---|---|---|---|
| 580,226 | 4/1897 | Sanford | 61/72.3 |
| 3,199,553 | 8/1965 | Garrett et al. | 61/72.3 UX |
| 3,233,667 | 2/1966 | Van Winkle | 61/72.3 X |
| 3,450,421 | 6/1969 | Harwell, Jr. | 166/.6 X |
| 3,466,881 | 9/1969 | Lamy | 61/72.3 |
| 3,658,366 | 4/1972 | Welch, Jr. et al. | 166/.6 X |
| 3,701,261 | 10/1972 | Nolan, Jr. | 61/72.3 |
| 3,704,033 | 11/1972 | Arnold | 166/.6 |
| 3,729,941 | 1/1973 | Rochelle | 166/.6 |

*Primary Examiner*—Jacob Shapiro
*Attorney, Agent, or Firm*—Poms, Smith, Lande & Glenny

[57] ABSTRACT

A means and method to facilitate making a flowline connection between a non-vertically disposed submerged connector means for subsea well operations. A surface vessel carrying a supply of flowline and of tension cable over a subsea well installation lowers one end of the tension cable to anchor the cable adjacent the subsea connector means and after moving away from the subsea installation, a tension control means imparts selected tension to the cable to maintain an approximate catenary curve while flowline is supported from and progressively advanced along the cable to the connector means at the subsea installation. Cable tension is controlled to provide a selected curve of the cable and flowline so that the attitude of the advancing end of the flowline is substantially aligned with the connector means at the subsea installation whereby a flowline connection with subsea pipe installations is effected without or with only minimum assistance from a diver or other subsea robot equipment.

6 Claims, 7 Drawing Figures

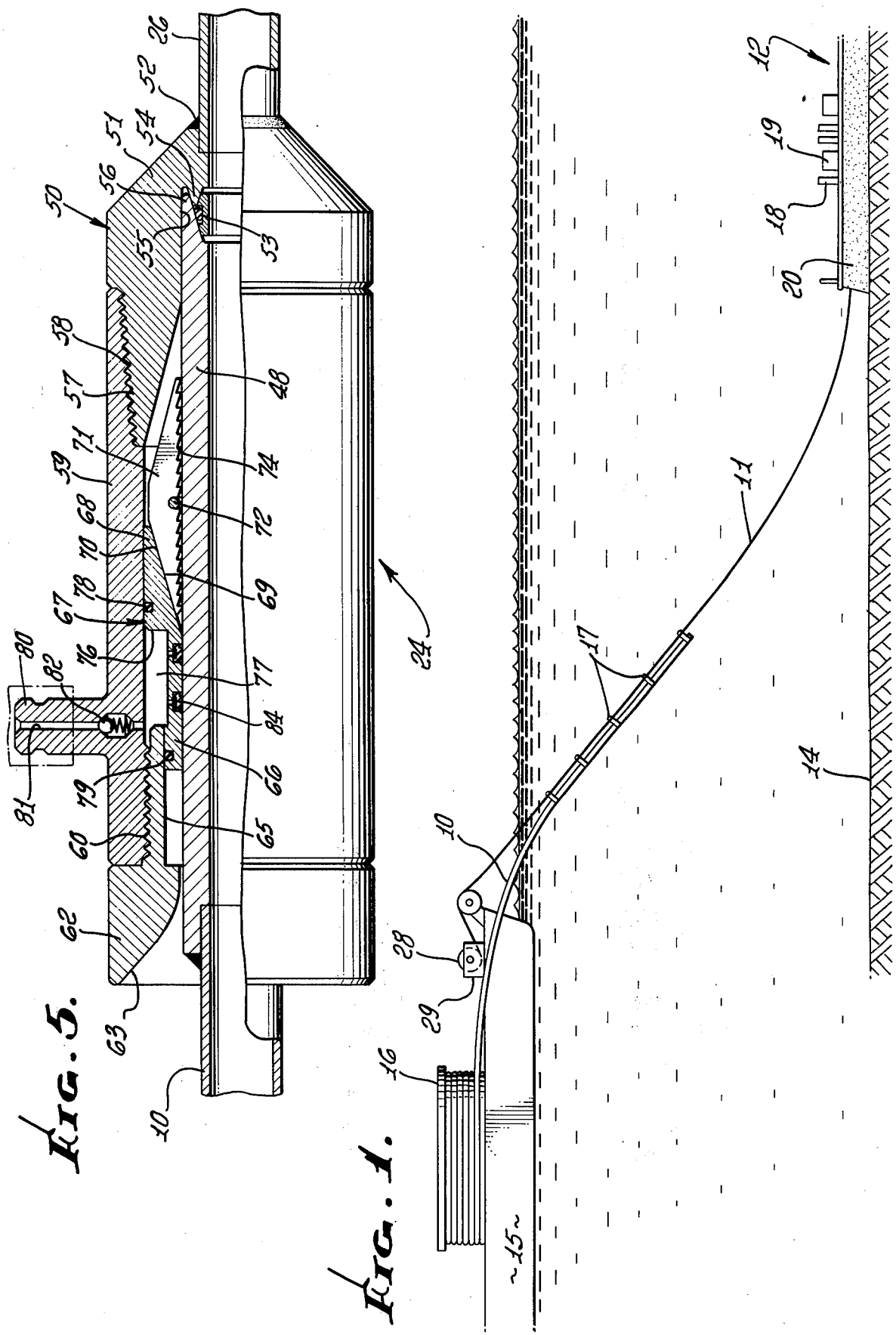

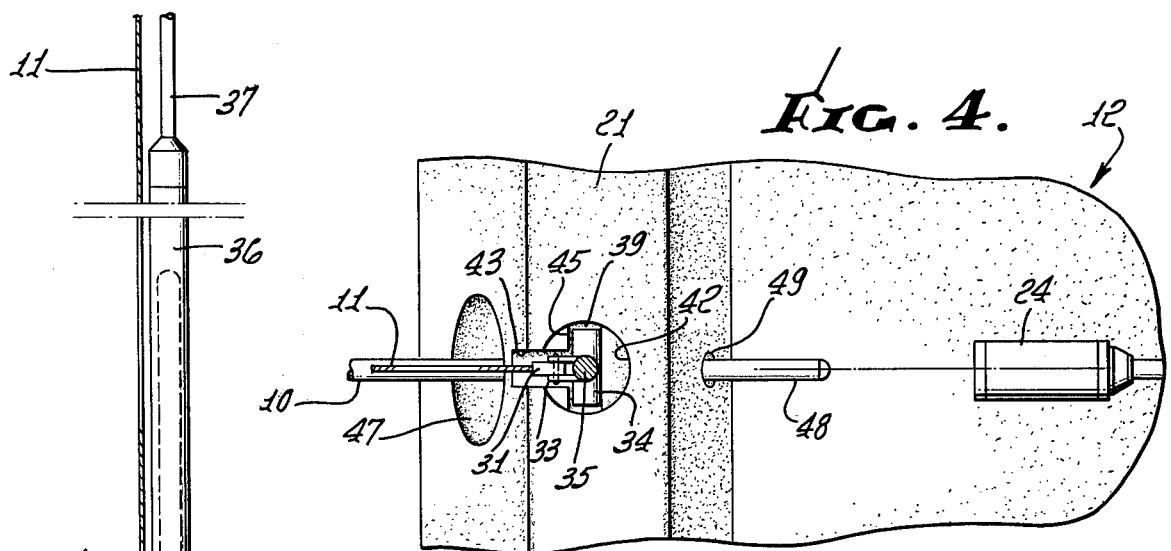
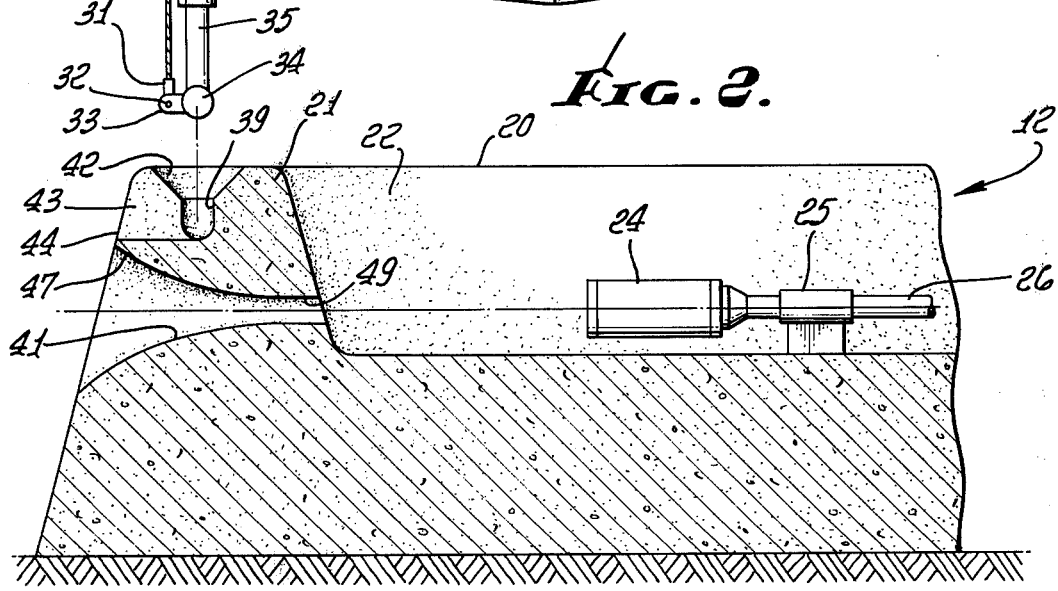
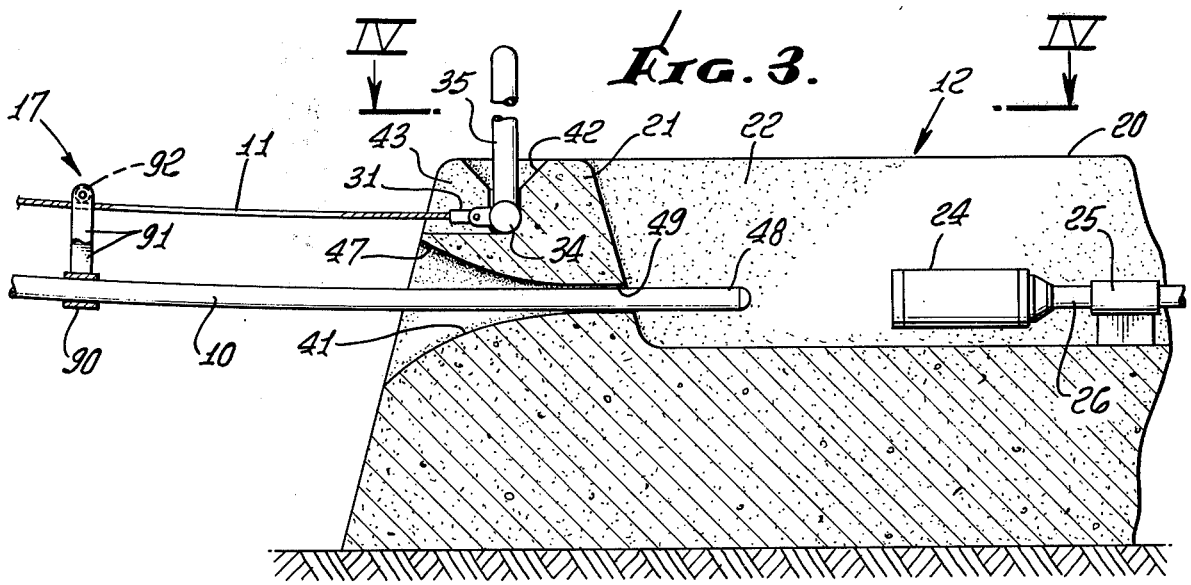

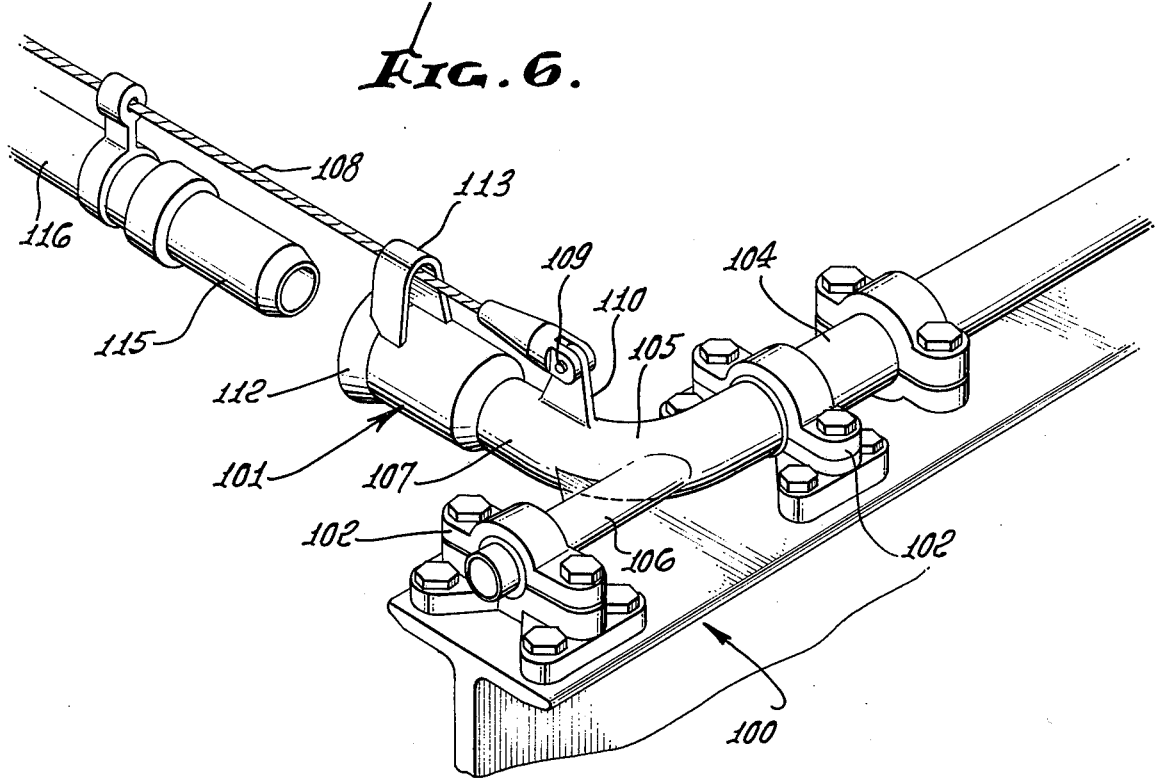
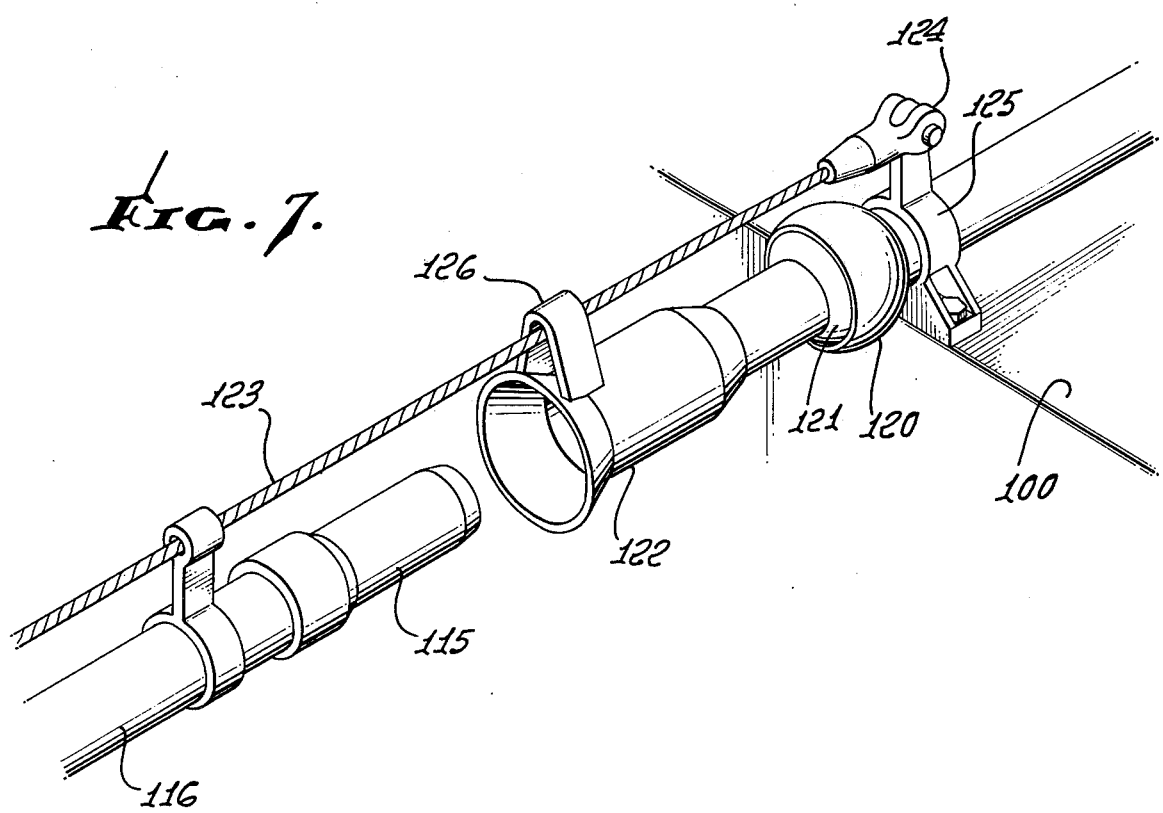

MEANS AND METHOD FOR MAKING A FLOWLINE CONNECTION TO A SUBSEA CONNECTOR MEANS

BACKGROUND OF INVENTION:

Subsea well operations often contemplate the transport of fluid, such as oil and gas, by pipe or flowlines along an ocean bottom between a subsea well producing installation and suitable storage means or supply source. Pipe or flowline connections at the subsea installation may be made by subsea divers or by subsea robots operated from suitable diving shells or other equipment. As the depth of a subsea installation increases in the attempts to produce oil from deep-sea locations, the use of divers and robots at such depths becomes more difficult and more involved. Therefore, it is desirable to use equipment which reduces to a minimum or avoids the use of subsea divers and robot equipment at very deep installations.

Prior proposed subsea wellhead installations have included preassembled wellheads and associated equipment lowered to a previously drilled wellhole and connected with the hole in well-known manner. Pipe connections made to such well installations have been made by suitable equipment to manipulate the end of a flowline to align the flowline with the pipe connector means on the wellhead installation. Problems were encountered in such alignment of a pipe end with a pipe connector means and completing a fluid-tight flowline connection to the connector means at the installation.

In some prior proposed flowline connection means, a pipe was guided vertically downwardly through the water to enter a vertically upwardly facing pivoted receptor which placed the pipe in fluid communication with an end of a flowline or other fluid communication means when the flowline was in connected locked position. (U.S. Pat. No. 3,373,807) In another prior flowline connection means, a continuous flowline on a reel was fed into the water from a pipe laying vessel and the slope and stresses of the flowline were controlled at the vessel to prevent over stressing or kinking of the flowline adjacent the sea bottom. The bottom end of the flowline was attached to a cable which was used to pull the flowline into a connecting means (U.S. Pat. No. 3,266,256). Another system for guiding a pipe end into exact position with respect to a pipe connection is shown in U.S. Pat. No. 3,592,014. Thus, in prior proposed systems for making underwater pipe connections and laying a pipe therefrom, the connections were made by diving means, by pulling or drawing a pipe into underwater equipment means for making the connection, and other equipment which placed the pipe or flowline under tension.

SUMMARY OF INVENTION:

The present invention relates to a means and method for making a flowline connection to a connector means forming part of a subsea installation in which a non-vertically disposed connector means on the subsea framework is adapted to receive and securely engage an end of a flowline which is aligned and advanced into the receptor means of the connector means. Generally speaking, the invention contemplates a means and method for supporting, advancing, and aligning a flowline end portion in a manner which facilitates the connection or coupling of the end of the flowline with the subsea connector means. For this purpose a guide and support line is anchored near the subsea connector means and extends to a surface vessel having a supply of tension cable serving as the guide and support for flowline which is also stored on the vessel. Means for hanging and transporting the flowline along the tension cable is made effectively operable by controlling the tension in the cable as the flowline is advanced therealong and the loads imposed upon the tension cable are progressively increased. Control of the tension cable also determines the curve at which the flowline is advanced toward the connector means and also the entry attitude of the flowline with respect to the connector means. Stresses on the flowline caused by drawing or pulling the flowline into a connector means are avoided. Since the flowline is supported along and by the tension cable and is provided relative movement with respect to the cable as by pushing or permitting gravity to assist in moving the pipe along the tension cable.

It is therefore a primary object of the present invention to disclose and provide a novel means and method for connecting a flowline to a subsea connector means.

An object of the invention is to disclose and provide a means for facilitating a subsea connection of a flowline to a pipe connector or coupling means wherein the attitude and alignment of the flowline end portion is accurately controlled to facilitate the coupling connection.

Another object of the present invention is to disclose a means and method for connecting a flowline to a subsea connector means wherein the flowline is supported and advanced toward the subsea connection in such a manner as to restrain the flowline from buckeling or from being subjected to excessive bending stresses.

A further object of the present invention is to disclose and provide a novel anchor arrangement for securing and fixing one end of the tension cable supporting the flowline to a subsea installation.

Another important object of the invention is to disclose and provide a method for connecting a flowline to be laid along the ocean floor to a generally horizontally disposed connector means at a subsea installation.

A further object of the invention is to provide a movably mounted connector means on a subsea installation wherein the connector means is provided with an anchor means for one end of the tension cable to positively align the approaching end of a flowline at various angles of approach.

A still further object of the invention is to provide a connector means at a subsea installation wherein the connector means is pivotally mounted, in one example of the invention, and mounted for universal movement, in another example of the invention, and wherein means are provided for holding an end of the tension flowline support cable in desired relation to the connector means to maintain an entry with respect to the approaching end of the flowline.

Another object of the invention is to provide a novel connector means for use at a subsea installation to facilitate connecting the end of a flowline thereto.

Various objects and advantages will be readily apparent from the following description of the drawings in which an exemplary embodiment of the invention is shown.

IN THE DRAWINGS:

FIG. 1 is a schematic elevational view of a flowline or pipe laying apparatus employing the method of this invention.

FIG. 2 is an enlarged fragmentary sectional view of a subsea well means and a cable means being lowered for connection to the subsea well means.

FIG. 3 is a view similar to FIG. 2 showing the connection of the cable means to the subsea well means and the support and alignment of an advancing flowline end to a subsea pipe connector on the subsea well means.

FIG. 4 is a fragmentary top plan view taken in the plane indicated by line IV—IV of FIG. 3.

FIG. 5 is an enlarged elevational view, partly in section, showing an exemplary pipe connector adapted for use in this invention.

FIG. 6 is a fragmentary perspective view of a pivotally mounted flowline connector means at a subsea installation.

FIG. 7 is a fragementary perspective view of a universally mounted flowline connector means at a subsea installation.

DETAILED DESCRIPTION OF THE DRAWINGS:

In FIG. 1 there is schematically shown a pipe or flowline being supported and advanced along a support or cable means 11 to flowline receiving means in the preferred form of a subsea installation 12 located on a subsea surface 14, the cable means 11 being anchored at the subsea installation and extending from a vessel 15 at the surface of the sea. Vessel 15 carries a supply of flowline 10 on a pipe spool or reel 16 from which the flowline is drawn by suitable means (not shown). The flexible support or cable means 11 includes hanger means 17 by which flowline 10 may be suspended from cable means 11 for slidable advancement of the free end portion of the flowline along the curve of cable 11 as determined by the tension of the cable as later described in detail.

Subsea installation 12 may comprise any suitable exemplary arrangement or construction for subsea equipment which may include one or more wellhead assemblies 18 and associated production control units 19 which may produce flow of gas and oil from a wellhole (not shown). Fluid from the wellhole is conducted and transported through the flowline 10 to suitable storage or collection areas at which the remote end of flowline 10 may be connected to a storage tank or storage vessel by suitable means. An exemplary arrangement for connecting the remote end of flowline 10 is that of a pipe ramp as described in my U.S. Pat. No. 3,517,518 issued June 30, 1970.

Subsea installation 12 may include a subsea wellhead assembly including a concrete structure 20 having an upstanding partially peripheral wall 21 which may define an upwardly facing recess or cavity 22. Within cavity 22 the flowline receiving means include a pipe connector means 24 supported a selected distance above the bottom surface of cavity 22 by a suitable pipe saddle or standard 25. Connector means 24 is associated with a pipe 26 which leads to the subsea equipment such as production unit 19 for conducting flow of fluid therethrough.

Guide and support means 11 hereafter referred to as cable 11 may be a suitable stranded steel cable of selected strength and tension characteristics for supporting flowline 10. Cable 11 may be carried in suitable supply on cable reels (not shown) on vessel 15 and may be wound on a winch drum 28 provided on the vessel adjacent to the location at which flowline 10 will be guided into the water. Winch drum 28 is operated by suitable power means and associated therewith is a means for controlling rotation of the winch drum to control the speed at which the cable 11 is paid out and to also impart to the cable 11 a desired tension as hereafter described. Such tension control means is schematically indicated at 29.

Means for connecting the free end of cable 11 to subsea installation 12 comprises a fitting 31 secured to the end of cable 11, said fitting 31 having an opening for a pivot pin 32 which extends into aligned openings provided in spaced arms 33 forming a yoke for fitting 31. Pin 32 may be secured against axial movement by suitable means. Arms 33 may be fixed to a transversely extending deadman bar 34 of suitable length and cross-sectional shape. Opposite arms 33, bar 34 is provided with an upstanding post 35 which during installation of the anchor connection to the subsea installation may extend into and be carried by a sub 36 carried by a string 37 (FIG. 2).

In this example subsea installation 12 utilizes a portion of the upstanding concrete peripheral wall to provide a formed recess 39 of approximately the same shape and length as bar 34 and located above a flowline guide funnel 41 having an axis coaxial with the projected axis of connector means 24 and associated pipe 26. Recess 39 lies transversely to said axis of funnel 41 and is spaced above said axis a distance approximating the length of hanger means 17. Recess 39 is provided with an outwardly flared upwardly opening counterbore 42 to facilitate lowering and entry of bar 34 into recess 39. In a direction parallel to the axis of funnel 41 a top opening slot 43 is provided from the side surface 44 of the peripheral wall 21 to the recess 39. Slot 43 permits the end portion of cable 11 to pivot about 32 to assume a suitable alignment position as shown in FIG. 3 during installation of the flowline 10.

The bar 34 loosely fits in slot 39 and serves as a "deadman" type of anchor wherein tension applied to cable 11 will cause the bar 34 to bear under pressure against walls 45 of recess 39. In the construction and design of the concrete peripheral wall 21 of the exemplary subsea installation, it will be understood that suitable reinforcing steel will be provided in the peripheral wall at recess 39 to assume and withstand loading placed upon the peripheral wall by cable 11 during installation of flowline 10. While this deadman type anchor connection for cable 11 to the concrete peripheral wall 21 illustrates a preferred type of anchor under such subsea installation conditions it will be understood that other types of anchor means and devices may be employed for connecting an end of a tension cable to the subsea installation at a particular location in relation to a pipe connector means.

The flowline receiving means further includes aligning means for aligning the advancing end of flowline 10 with connector means 24. Preferably, the flowline receiving means includes subsea installation 12 having a funnel which provides means for aligning the advancing end of flowline 10 with connector means 24. Funnel 41 formed in the concrete peripheral wall 21 below recess 39 may be provided with an enlarged outwardly flaring entry opening 47 to facilitate guiding and insertion of the free end 48 of flowline 10 into funnel 41. Funnel 41 contracts at its outlet end 49 to a cross-sectional size sufficiently greater than the cross section of flowline 10 so as to permit passage of end 48 through outlet 49 without binding and to accommodate some misalignment of pipe 10 with the axis of funnel 41 as permitted by the outwardly flaring entry 47.

It will thus be noted that the funnel 41 and connector means 24 are coaxial and that the slot 43 of the anchor means for cable 11 will permit positioning of the axis of cable 11 in a substantially vertical plane which includes the axis of funnel 41 and connector means 24. Thus alignment of the flowline end 48 with connector means 24 in the vertical plane is facilitated and the narrow outlet end 49 of the funnel also contributes to such alignment in the vertical plane.

Flowline 10 may comprise suitable metal pipe or conduit of selected diameter for conducting flow of fluid to or from the subsea installation. Flowline 10 is preferably welded into a continuous uninterrupted length of pipe and may be carried in well-known manner on a large spool or reel 16. It will also be understood that the supply of flowline may be in selected linear lengths and the lengths coupled together in well-known manner as the flowline is being laid.

Pipe connectors means 24 may comprise an elongated generally cylindrical hollow body means 50 comprising an end body portion 51 secured as by welding at 52 to pipe 26. End portion 51 may carry an internal seal ring means 53 adjacent an end directed annular rib 54 which provides with said seal ring an end facing annular recess 55 for reception of a tapered end 56 of flowline 10. Body portion 51 includes external threads 57 for engagement with internal threads 58 of a central sleeve body portion 59.

Central body portion 59 is provided with internal threads which engage external threads as at 60 of end body portion 62 having a curved outwardly flaring opening 63 for reception of end 48 of flowline 10. End body portion 62 includes an internal cylindrical surface 65 of a diameter greater than the end portion 48 of flowline 10 to define an annular space therebetween for slideable reception of one end 66 of an annular actuator means 67. Actuator means 67 includes an opposite wedge and 68 having a wedge surface 69 slidably engaging a wedge surface 70 on eachof a plurality of slips 71. Slips 71 may be held in assembly within connector means 24 by a wire ring 72 recessed in the central internal surface of the slips 71. Each slip 71 includes a radially inwardly facing serrated or tooth surface 74 for pressure engagement with the outer surface of end portion 48 of the flowline, the serrations or teeth 74 being directed in a direction opposite that of withdrawal of flowline 10 from connector means 24.

End portion 62 provides with a surface 76 of wedge portion 68 a fluid pressure chamber 77 which may be sealed at 78, 79 to provide a pressure tight chamber. Pressure fluid may be introduced to chamber 77 through a fitting 80 having an inlet passage 81 provided with a biased check valve 82. When a flowline 10 is not connected to connector means 24, pressure fluid in chamber 77 is minimal, actuator means 67 and slips 71 are to the left of the position shown in FIG. 5.

Pressure chamber 77 may also communicate with annular wiping seals 84 which may bear upon the external surface of flowline end portion 48 as it is being inserted into the connector means 24. When end portion 48 is received in connector means 24, its position in locked pressure seal relation is assured by introduction of pressure fluid in chamber 77 which causes the actuator means 67 to advance towards body end portion 51. Slips 71 are wedged into gripping engagement with end portion 48 which will be driven forwardly thereby to place seal ring means 53 under compression and in tight pressure sealing relation with annular rib 54.

Retraction or reversing the direction of movement of end 48 with respect to body means 50 will cause the teeth 74 on slips 71 to further bite into the external surface of end 48 and are further wedged by wedge section 68 to non-releasably retain the end 48 of the flowline 10.

Hanger means 17 may be of any suitable construction and may comprise a collar 90 to be fitted around flowline 10, said collar 90 being fixed to hanger members 91 which carry at their top ends a pivotally mounted roller 92 which rides upon cable 11. Hanger means 17 includes securement clamp and bolt means not shown which facilitate rapid assembly of each hanger means 17 with the flowline and cable.

In the method of making the flowline connection to connector means 24, vessel 15 is first positioned over subsea installation 12. Cable 11 attached to sub 36 on pipe string 37 is lowered to the installation 12 until the bar 34 is received in recess 39. Sub 36 may then be disconnected from upstanding post 35 and withdrawn therefrom. Upstanding post 35 provides suitable weight to retain bar 34 in recess 39 under normal installation conditions.

Vessel 15 then moves away from subsea installation 12 in the direction in which flowline 10 is to be laid and preferable in a vertical plane or zone which includes the plane defined by slot 43 and the axis of funnel 41 and connector means 24. After the vessel is moved a sufficient distance away from subsea installation 12 so that cable 11 has relatively great length with respect to its size and unit weight and may be considered flexible relative thereto, cable 11 in its path from the vessel to the installation 12 assumes the approximate shape of a limb of a cantenary curve. In the curve of such a catenary limb, the low end portion adjacent the subsea installation may be slightly upwardly inclined or a horizontal position.

Flowline 10 may then be uncoiled from spool 16 and the first hanger means 17 attached to flowline 10 in spaced relation to the end 48 of the flowline so that the first hanger means 17 will be located in final position in spaced relation to the outer surface 44 of the subsea installation 12. As the flowline 10 is thus uncoiled, connected by spaced hanger means to cable 11, and fed along cable 11 it will be apparent that the additional weight of the flowline as it advances along cable 11 will change the curved shape of cable 11. To maintain the most effective curved shape to permit the flowline to advance along cable 11 with the rollers of the suspension means 17 in the most optimum position to support, guide, and roll along cable 11, the tension control means for the cable on the vessel is controlled to impart varying tension characteristics to the cable to achieve such optimum curved shape due to the progressively increasing weight of the advancing flowline 10. Flowline 10 may also be treated as a virtually flexible member because of the great length thereof as compared with its size and unit weight. Thus both cable 11 and flowline 10 as it is supported along cable 11 may be considered as assuming a shape or curve which approximates that of a limb of a catenary curve. Since the flowline is relatively movably supported from the cable 11, tension forces applied to the cable are not transmitted to the flowline.

Ultimately, end 48 of flowline 10 approaches subsea installation 12. The space or distance end 48 is from surface 44 of the subsea installation or connector means 24 is accurately known because the length of cable 11 is known and the length of flowline advanced along cable 11 is also known. Just prior to end 48 entering funnel 41 the vertical alignment of flowline 10 with the axis of connector 25 is roughly approximated by the vertical aligned relationship of cable 11 and the axis of funnel 41. Further vertical alignment is accomplished by positioning vessel 15 with respect to the subsea installation 12 so that, taking into account subsea currents and drift, end 48 will be in substantial vertical alignment with connector means 24.

The attitude and position of end 48 with respect to the horizontal dimension is achieved by controlling the tension in cable 11. The weight of pipe 10 being supported by cable 11 and the weight of hangers 17 and cable 11 will, under selected controlled tension of cable 11, position the portion of cable 11 and flowline 10 adjacent to the anchor substantially horizontal, such attitude being achieved by the controlled tension imparted to cable 11. Since hanger means 17 are of selected length corresponding to the distance between the axis of funnel 41 and the bottom of recess 39, it will be apparent that end 48 approaches funnel 41 substantially horizontal and in substantial vertical alignment. As flowline 10 is further advanced, the end 48 enters funnel 41 and is guided thereby to the narrower outlet 49. The spacing between outlet 49 and the receiving open end 63 of the connector means 24 is relatively close so that only minimal misalignment of the axis of flowline 10 is permitted with respect to the fixed axis of the connector means 24.

As end 48 enters mouth 63 of connector means 24, the flaring surfaces of the receptor inlet further guide the end 48 into the hollow cylindrical body means 50. The point at which this occurs is readily identified on vessel 15 because of the specific lengths and dimensions of the funnel, space between outlet 49 and connector means 24, and the length of the chamber in which end 48 is received in body means 50. As end 48 moves axially in body means 50, its external surface is wiped by the seal means 84 and is slidable passed teeth 74 until the nose of end 48 is received in the recess 55.

Actuator means 67, upon actuation thereof, drives the slips 71 and end 48 forwardly to positively pressure seal body end 51 with respect to end 48 as earlier described. Any movement of end 48 in reverse direction or outwardly from connector means 24 is limited and restrained by further biting of slips 71 into the external surface of end 48 and the further wedging of slips 71 against said surface by the wedge sections 68. Thus a fluid-tight, self-acting, non-releasable flowline connection is made with connector means 24 without assistance of a diver.

Upon connecting and securing flowline 10 to the subsea installation, vessel 15 may then proceed to continue to lay flowline 10 on the ocean bottom in well-known manner. If desired, cable 11 may be withdrawn and recovered from the subsea installation after release from vessel 15 by lowering a sub for connection to upstanding post 35 and then raising the deadman bar 34 out of recess 39. Cable 11 attached thereto may then be pulled through the plurality of spaced hangers attached to flowline 10 until cable 11 was free for rewinding on a cable drum. Hangers 17 may be abandoned at the bottom of the sea or hangers 17 may be of a type which may be adapted to be readily releasable from flowline 10 upon applying a selected force to cable 11.

Control of the path of flowline 10 as it is advanced along cable 11 is continuous from the time of connection of the flowline to cable 11 to the moment of self-securing connection of end 48 to the installation 12 at connector means 24. Such control facilitates achieving the desired alignment and vertical attitude of flowline end 48 at the installation 12. The control of the path of the flowline is facilitated by use of the tension control means on the vessel on a suspended generally flexible composite means which is approximately a depending limb of a catenary curve.

In FIG. 6, a modification of the means for connecting the lower end of a flowline to a connector means at a subsea location is shown. In this modification the subsea installation is only fragmentarily indicated and may include a base member 100.

Means for pivotally mounting flow connector means 101 on base member 100 may include a pair of spaced bearing means 102 of suitable construction. One bearing means 102 encircles one portion 104 of an elbow pipe member 105 having a shaft extension 106 projecting beyond the elbow in alignment with the axis of elbow portion 104. Shaft 106 is pivotally mounted in the other bearing means 102. The other elbow portion 107 may be connected with flowline connector means 101 which may be of a type described in the prior embodiment or other suitable receptor portion of a connector means.

In this embodiment, tensioning line means or cable 108 is pivotally connected at 109 to an anchor lug 110 provided on elbow portion 107 in alignment with the axis thereof. Outwardly flared open receptor end 112 of connector means 101 may include a guide eye 113 secured in suitable manner as by welding to the outer surface of connector means 101. Tension means 108 passes through eye 113 for making the pivotal connection at 109. Thus the lower end portion of cable 108 is aligned and parallel with the axis of elbow portion 107 as end 115 of the flowline 116 moves along the cable 108 into proximity with the receptor opening 112. It will be apparent that the end of flowline 116 will be readily aligned and guided into the receptor opening 112 of the connector means 101 while being supported in sliding movable relation to cable 108.

In operation of the modification shown in FIG. 6, it will be understood that operational equipment at the surface of the water and on the barge will be substantially the same as that described hereinabove. In the event the angle of approach of the flowline end 115 varies, it will be apparent that cable 108 will permit movement of flowline end 115 into axial alignment with the connector means 101. The angle of approach of flowline 115 may vary depending upon the tension forces imparted to the tensioning line means 108. However, since the tensioning line means 108 is anchored on elbow portion 107 which is pivotally movable about the axis of the shaft extension 106 and the elbow portion 104, connector means 101 will automatically adjust itself to the angle of approach of the flowline 115 by movement in the plane generally normal to the axis of the shaft extension 106. Adjustment of the flowline end 115 in planes other than the plane of movement of elbow portion 107 is readily accomplished by tensioning line means 108 and its movement with respect to the front face of the eye 113. The spacing of the axis of the tension line means 108 from the axis of the flowline end 115 and the tension line means as defined by eye 113 and the axis of the connector means 101 is substantially the same so that the tapered end of flowline 116 may be readily accommodated within the outwardly flared end of the connector for making the connection. The connector means 101 may be actuated in the same manner as that described in the prior embodiment.

In a further example of this invention, FIG. 7 the pivotal mounting of flow connector means 101 may be modified for pivotal movement about more than one axis, such as a universal type mounting. In such universal mounting, the connector means may include a part spherical seat means 120 on base member 100 to receive a ball end 121 on a movable connector member 122 to permit limited swiveling motion in the seat means. The tensioning cable 123 is connected at one end 124 to pipe holder means 125 and extends through an eye element 126 at the free end of the movable connector member to guide the flowline into assembly therewith.

In operation, the universal mounting may be similar to the embodiments of the invention described above.

It will be understood that various modifications and changes may be made in the apparatus described and in the practice of the method of this invention and all such changes and modifications coming within the scope of the appended claims are embraced thereby.

I claim:

1. In an apparatus for connecting a flowline to a subsea well means at a subsea location, the combination of:
    connector means at said subsea well means adapted to receive an end of a flowline in approximately axial alignment;
    flexible guide and support tension means for said flowline extending from a vessel carrying a supply of flowline;
    means connecting one end of said guide and support means to said subsea well means near said connector means;
    means on said vessel for controlling tension of said guide and support means to maintain the guide and support means in a preselected curve while said flowline is advanced along said guide and support means toward said subsea well means;
    and means at said subsea well means for aligning the advancing end of the flowline with the connector means,
    whereby the advancing end of said flowline is receivable in and connectable to said connector means, said means connecting one end of said guide and support means to the subsea well means including an anchor means in said subsea well means,
    said anchor means including an anchor receptor having a top transverse opening and a longitudinal opening extending in the direction of the following to be laid.

2. In an apparatus as stated in claim 1 wherein said aligning means includes
    a funnel-shaped port in said subsea well means located below said anchor means.

3. Means for connecting a flowline to a flowline connector means at a location below a water surface, the combination of:
    a supply source of flowline movable along a water surface;
    a submerged flowline connector means remote from said supply source having a flowline coupled thereto for receiving and securing one end of a flowline from said supply source to said flowline coupled to said connector means for passage of fluid therethrough;
    a tension line means, including a supply thereof near said supply source and extending along a path through the water toward said submerged connector means;
    one end of said tension line means being aligned and anchored with respect to said submerged flowline connector means;
    means for supporting and moving said flowline from said supply source along said tension line means to follow said path of said tension line means;
    and means for controlling the tension in said tension line means during movement of the flowline therealong to provide a selected attitude of the flowline end from said supply source at said connector means for reception and connection of the flowline end to said flowline coupled to said connector means;
    said flowline connector means including pivotal mounting means for alignment of the connector means with the end of an approaching flowline.

4. A means as stated in claim 3 wherein said tension line means is anchored on said pivotally mounted connector means.

5. Means for connecting a flowline to a flowline connector means at a location below a water surface, the combination of:
    a supply source of flowline movable along a water surface;
    a submerged flowline connector means remote from said supply source for receiving and securing one end of a flowline for passage of fluid therethrough;
    a tension line means including a supply thereof near said supply source and extending along a path through the water toward said submerged connector means;
    one end of said tension line means being aligned and anchored with respect to said submerged flowline connector means;
    means for supporting and moving said flowline along said tension line means to follow said path of said tension line means;
    and for controlling the tension in said tension line means during movement of the flowline therealong to provide a selected attitude of the flowline end at said connector means for reception and connection of the flowline end to said connector means, said flowline connector means including an elbow provided with a receptor for said flowline end and a connection to said tension line means;
    an extension from said elbow;
    and means pivotally mounting said extension and said elbow for pivotal adjusting movement of said receptor or aligning said receptor with the end of said flowline.

6. In a method of connecting a flowline to a submerged connector means having flowline coupled thereto at a subsea location comprising, the steps of:
    providing a source of continuous cable and nearby a source of flowline on a vessel;

connecting one end of said cable to said submerged connector means adjacent the end of a path to be taken by a flowline to said submerged flowline connector means;

tensioning said cable to assume a selected curve as the vessel moves away from said submerged flowline connector means;

supporting and slidably advancing said flowline from said source and on said cable towards said submerged connector means;

controlling tension in said cable to approximately maintain said selected curved shape in said cable and to impart said curve to said advancing flowline whereby the axis of the advancing end of said flowline approaches said submerged pipe connector in approximate coaxial relation to the prolongation of the longitudinal axis of the flowline connector means, guiding the axis of the advancing end of said flowline into precise alignment with the axis of said flowline connector means, and coupling said advancing end to said flowline connector means in fluid-tight engagement.

* * * * *

UNITED STATES PATENT OFFICE
CERTIFICATE OF CORRECTION

Patent No. 4,024,724                     Dated    May 24, 1977

Inventor(s)         Edward E. Horton

It is certified that error appears in the above-identified patent and that said Letters Patent are hereby corrected as shown below:

Column 4, line 38, before "32" insert - - pin - -.
Column 6, line 40, change "cantenary" to - - catenary - -.
Column 9, line 60, change "following" to - - flowline - -.
Column 10, line 51, after "and" insert - - means - -.
Column 10, line 65, after "having" insert - - a - -.

Signed and Sealed this

Seventh Day of March 1978

[SEAL]

Attest:

RUTH C. MASON
*Attesting Officer*

LUTRELLE F. PARKER
*Acting Commissioner of Patents and Trademarks*